United States Patent
Styliadis et al.

(10) Patent No.: US 11,012,432 B2
(45) Date of Patent: *May 18, 2021

(54) METHOD FOR DISTRIBUTED APPLICATION SEGMENTATION THROUGH AUTHORIZATION

(71) Applicant: Aporeto, Inc., San Jose, CA (US)

(72) Inventors: Dimitri Styliadis, San Jose, CA (US); Satyam Sinha, Los Altos, CA (US)

(73) Assignee: Aporeto, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/821,016

(22) Filed: Mar. 17, 2020

(65) Prior Publication Data

US 2020/0252384 A1     Aug. 6, 2020

Related U.S. Application Data

(63) Continuation of application No. 15/787,030, filed on Oct. 18, 2017, now Pat. No. 10,601,802.

(60) Provisional application No. 62/410,640, filed on Oct. 20, 2016.

(51) Int. Cl.
*H04L 29/06* (2006.01)
*H04L 9/32* (2006.01)
*G06F 21/45* (2013.01)
*G06F 21/30* (2013.01)

(52) U.S. Cl.
CPC .............. *H04L 63/08* (2013.01); *G06F 21/30* (2013.01); *G06F 21/45* (2013.01); *H04L 9/3247* (2013.01); *H04L 63/0227* (2013.01); *H04L 63/0807* (2013.01); *H04L 63/123* (2013.01); *H04L 63/20* (2013.01); *H04L 63/0428* (2013.01)

(58) Field of Classification Search
CPC .......... G06F 21/30; G06F 21/45; G06F 21/44; G06F 21/445; H04L 63/08; H04L 63/0807; H04L 63/0869; H04L 63/0884; H04L 63/0892
See application file for complete search history.

(56) References Cited

U.S. PATENT DOCUMENTS

| | | | |
|---|---|---|---|
| 6,725,276 B1 * | 4/2004 | Hardjono | H04L 12/1836 709/238 |
| 2007/0133530 A1 * | 6/2007 | Previdi | H04L 45/16 370/390 |

* cited by examiner

*Primary Examiner* — Edward Zee
(74) *Attorney, Agent, or Firm* — Goodwin Procter LLP

(57) ABSTRACT

Methods and supporting systems for managing secure communications and establishing authenticated communications between processes of a computer application operating across network domains are provided. Authentication agents operate on servers hosting application processes, wherein each authentication agent has access to policies related to each of the application processes. An authentication agent operating on an originating server intercepts transmissions from an originating application processes and appends a trust profile associated with the originating application process. The transmission is released to a receiving server, where it is intercepted and validated at the receiving server by a second authentication agent on the receiving server. If the validation succeeds the transmission is forwarded to the receiving application process where it is executed, processed or otherwise acted upon acted upon, and the receiving server provides an acknowledgement transmission to the originating server confirming the transmission was received and processed by the receiving application process.

16 Claims, 6 Drawing Sheets

| Attribute | Value |
|---|---|
| Image | Nginx |
| Environment | Production |
| Vulnerability | High |
| Location | Data Center East |
| ServerName | ExampleServer |
| FilePath | /user/application |
| IP Address | 10.1.1.5 |
| Application Type | Web |
| System Call Accessed | 304 |

Figure 2 – Trust Profile

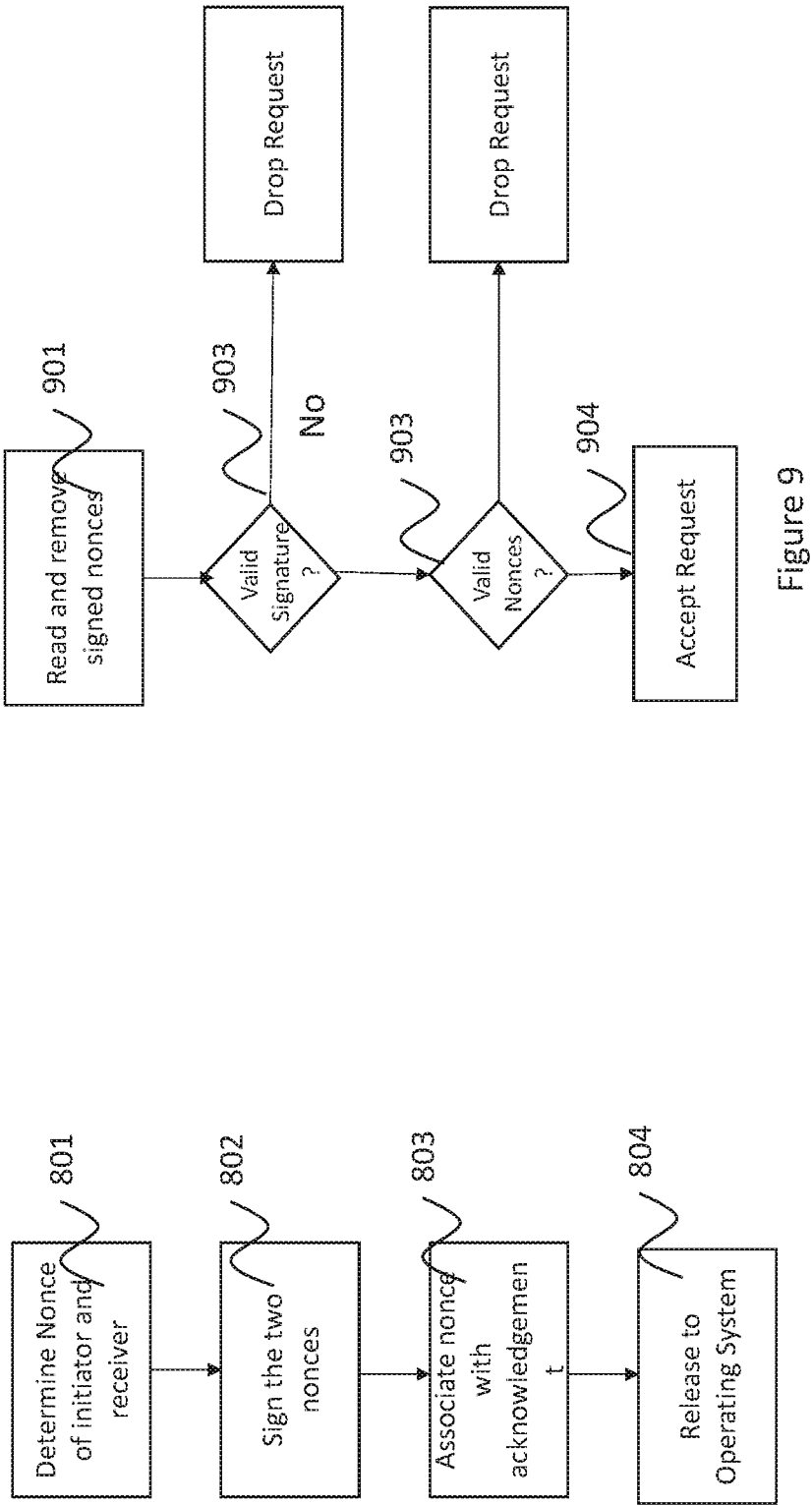

METHOD FOR DISTRIBUTED APPLICATION SEGMENTATION THROUGH AUTHORIZATION

CROSS-REFERENCE TO RELATED APPLICATIONS

This application is a continuation of and claims priority to U.S. patent application Ser. No. 15/787,030, filed Oct. 18, 2017, which claims priority to and the benefit of U.S. provisional patent application Ser. No. 62/410,640, filed on Oct. 20, 2016, and entitled "Method for Distributed Application Segmentation Through Authorization", the entire disclosure of which is incorporated by reference herein.

FIELD OF THE INVENTION

In general, embodiments of this disclosure relate to improved security measures for networked computer applications and, in particular, to systems and methods for improving the security of applications operating across different network domains.

BACKGROUND

In conventional application architecture, a set of application processes may be used to implement an application such as an e-commerce web site or a credit transaction processing site. The application may be implemented as a set of independent process, such as a web processing tier, a business logic tier, and a database tier. The number of processes implementing each tier of the application can vary dynamically based on processing load. For example, for a commerce web-site during high-peak times the number of web tier instances will increase, whereas during low activity times the number may be reduced. Furthermore, proper security design suggests that the processes implementing the web tier should not directly communicate with the database processes, as such a safeguard prevents an attacker accessing the web tier that is exposed to the Internet from directly accessing data in the database tier.

In an alternative example, an organization may wish to separate production applications from testing or development environments so that an experiment in the development environment does not impact in the production environment. This form of segmentation, or separation of applications in different environments, is typically implemented through conventional network rules or networking techniques.

One common approach to increasing the security of network-based computer applications is the separation of applications in different networking domains. Applications within a network domain can communicate with each other over the network and for specific network ports, while applications in different domains are restricted in their communication patterns. Segmentation of applications to different trust domains often uses technologies such as Virtual LANs (VLANs) or firewalls to filter traffic based on the source and destination IP addresses and port numbers. In some instantiations, firewalls are dedicated devices in the network, whereas in other instantiations they are part of host systems. In the latter case, a control plane may be used to manage a set of rules used that direct the firewalls. For example, the control plane can associate an application with certain IP addresses and port numbers and populate the corresponding firewall rules every time a new application is instantiated in the network.

There are several problems with these techniques that limit the ability to scale such systems. In a large application deployment, very often application components are instantiated for short periods of time, requiring the control plane to quickly discover new applications and modify all firewall rules in the system to allow specific access for this application.

For example, a set of applications A with cardinality nA communicates with a set of applications B with cardinality nB, and these applications have random IP addresses. Implementing conventional segmentation with firewalls would result in nA×nB firewall rules (essentially a firewall rule between every source and destination). This is inherently an exponentially expanding set that cannot scale to the requirements of modern cloud systems.

SUMMARY OF THE INVENTION

In various aspects and embodiments, this invention provides techniques and associated systems to implement an alternative application authentication and authorization model that allows application segmentation to scale linearly in relation to the number of components and therefore we can scale the security operations to very large clusters of applications.

An application is usually composed from one or more processing units that can be running in the same or multiple data centers or as processes or containers. A container is defined in the industry as the set of executables and libraries that the application uses, packaged together in single execution unit. The approach is based on translating segmentation problem to an authorization problem and maintaining and carrying the context of the applications in the communications between two entities. More specifically, application (or workload) segmentation is achieved by enforcing end-to-end authentication and authorization between any two processing units that comprise different applications.

Therefore, in one aspect, the invention provides a method for managing secure communications and establishing authenticated communications between processes of a computer application operating across network domains. The method includes providing authentication agents to servers hosting application processes and operating in different domains, wherein each authentication agent has access to policies related to each of the application processes. An authentication agent operating on an originating server intercepts transmissions from an originating application processes executing on the originating server prior to transmission to a receiving application processes executing on a receiving server and appends a trust profile associated with the originating application process to the transmission. The transmission is released to the receiving server, where it is intercepted and validated at the receiving server by a second authentication agent on the receiving server. The trust profile is removed from the transmission and, if the validation succeeded the transmission is forwarded to the receiving application process where it is executed, processed or otherwise acted upon acted upon, and the receiving server provides an acknowledgement transmission to the originating server confirming the transmission was received and processed by the receiving application process. If the validation was not successful, the transmission is dropped such that it does not reach the receiving application process and no acknowledgement transmission is sent to the originating application process.

In some embodiments, the trust profile includes a process identifier and a context, where the context may be one of a production environment, a testing environment and a development environment. The validation process may include validating a digital signature placed in the payload of the transmission by the first authentication agent, and, in some cases, comparing the trust profile received with the transmission to one of the policies, wherein the one of the policies comprises permitted interactions between the originating application process and the receiving application process, which, in some implementations are provided by one or more policy servers accessing a single policy store. In some instances, the originating and receiving application processes support a common application.

In some embodiments, the acknowledgement process includes intercepting the acknowledgement transmission by the authentication agent on the receiving server prior to transmission, associating a trust profile associated with the receiving application process to the acknowledgement transmission, and transmitting the acknowledgement transmission from the receiving server to the originating server.

In some cases, the acknowledgement transmission is intercepted at the originating server prior to reaching the originating application process, and the trust profile associated with the receiving application process is validated and forwarded to the originating application process. The validation process for the trust profile associated with the receiving application process may include comparing the trust profile received with the acknowledgement transmission to one of the policies, such as a list of permitted interactions between the originating application process and the receiving application process. In some embodiments, subsequent transmissions may be permitted between the originating application process and receiving application process without interception by the authentication agent.

In another aspect, the invention provides a system for managing secure communications and establishing authenticated communications between processes of a computer application operating across network domains. The system includes memory for storing computer-executable instructions and processing unit(s) for executing the instructions stored on the at least one memory. Execution of the instructions programs by the processing unit to performs operations that include providing authentication agents to servers hosting application processes and operating in different domains, wherein each authentication agent has access to policies related to each of the application processes. An authentication agent operating on an originating server intercepts transmissions from an originating application processes executing on the originating server prior to transmission to a receiving application processes executing on a receiving server and appends a trust profile associated with the originating application process to the transmission. The transmission is released to the receiving server, where it is intercepted and validated at the receiving server by a second authentication agent on the receiving server. The trust profile is removed from the transmission and, if the validation succeeded the transmission is forwarded to the receiving application process where it is executed, processed or otherwise acted upon acted upon, and the receiving server provides an acknowledgement transmission to the originating server confirming the transmission was received and processed by the receiving application process. If the validation was not successful, the transmission is dropped such that it does not reach the receiving application process and no acknowledgement transmission is sent to the originating application process.

In some embodiments, the trust profile includes a process identifier and a context, where the context may be one of a production environment, a testing environment and a development environment. The validation process may include validating a digital signature placed in the payload of the transmission by the first authentication agent, and, in some cases, comparing the trust profile received with the transmission to one of the policies, wherein the one of the policies comprises permitted interactions between the originating application process and the receiving application process, which, in some implementations are provided by one or more policy servers accessing a single policy store. In some instances, the originating and receiving application processes support a common application.

In some embodiments, the acknowledgement process includes intercepting the acknowledgement transmission by the authentication agent on the receiving server prior to transmission, associating a trust profile associated with the receiving application process to the acknowledgement transmission, and transmitting the acknowledgement transmission from the receiving server to the originating server.

In some cases, the acknowledgement transmission is intercepted at the originating server prior to reaching the originating application process, and the trust profile associated with the receiving application process is validated and forwarded to the originating application process. The validation process for the trust profile associated with the receiving application process may include comparing the trust profile received with the acknowledgement transmission to one of the policies, such as a list of permitted interactions between the originating application process and the receiving application process. In some embodiments, subsequent transmissions may be permitted between the originating application process and receiving application process without interception by the authentication agent.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the invention.

FIG. 2 is an illustrative example of a trust profile used in accordance with various embodiments of the invention.

FIG. 8 is a flow chart illustrating a method for processing communications on an originating server in accordance with various embodiments of the invention.

FIG. 9 is a flow chart illustrating a method for processing communications on a receiving server in accordance with various embodiments of the invention.

DETAILED DESCRIPTION

Figure 1:
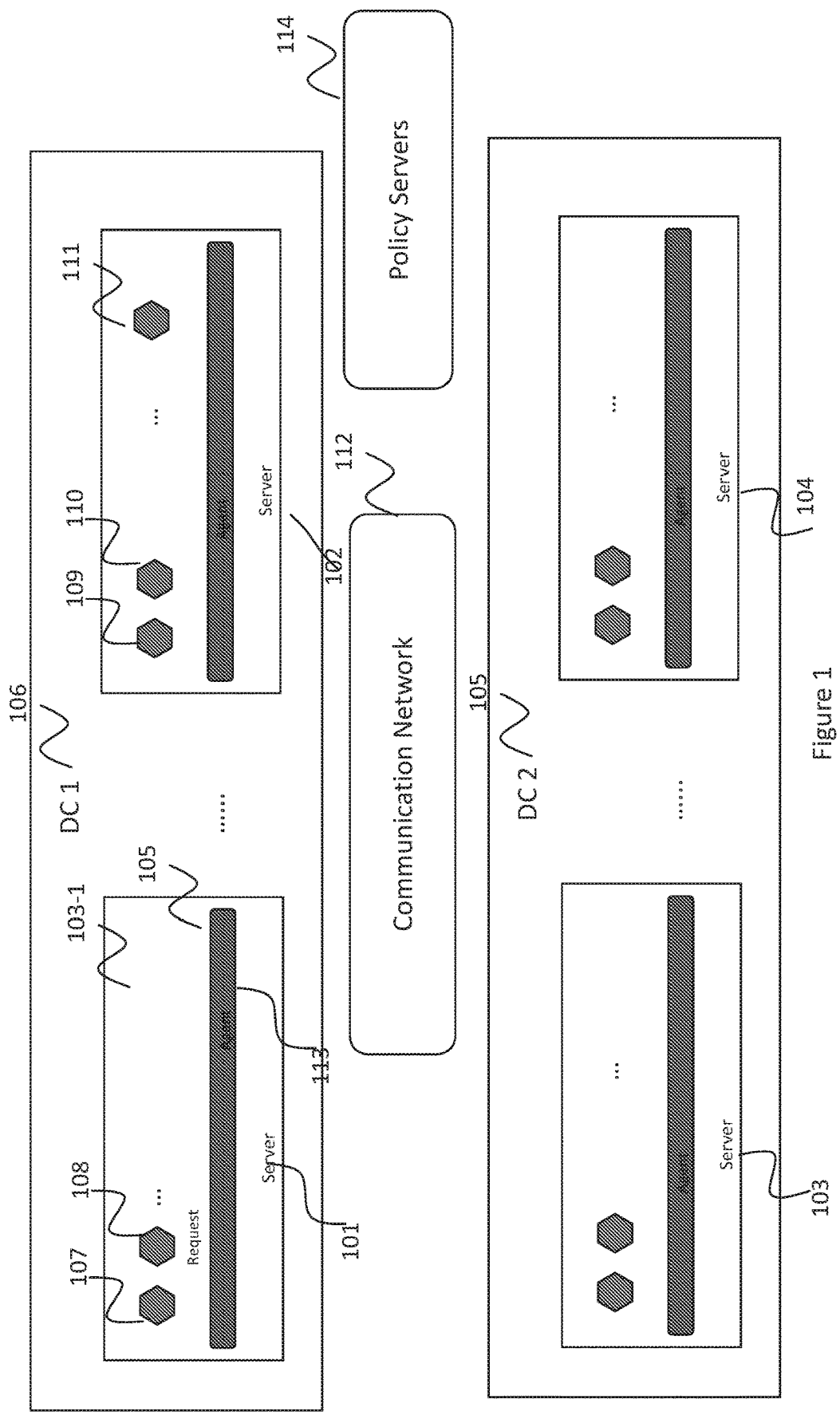
FIG. 1 is an architectural diagram depicting components used to implement the systems and methods in accordance with various embodiments of the invention.

FIG. 1 is a high level block diagram illustrating one possible environment in which the systems and techniques described herein can operate. A set of servers 101, 102, 103, 104 each can host one or more applications. The servers can be located in one or multiple physical data centers (105, 106). Each server can host processes or container(s) from different applications. For example, application A is comprised of processes 107 and 109 hosted in two different servers. Application B is comprised of processes 108, 110, 111, where some of its processes are in the same server and some are in different servers. The servers are interconnected through some communication network 112. Any form of communication network technology can be used. In some cases, the servers may operate in different contexts or domains, meaning the communication channels among servers requires stringent authentication protocols.

In one embodiment of the invention, an agent 113 is associated with each server.

Alternative implementations allow the agent 113 to be implemented as part of a network device or a virtualization hypervisor. The agent 113 monitors activity in the local system and determines when new applications are instantiated. In one embodiment, the agent 113 listens to notifications of the local operating system and determines when a new application is instantiated. In other implementations the agent can poll the local system for changes or be notified through an interface from external sub-systems.

When an application process is activated the agent 113 dynamically creates the trust profile for the application process and communicates with a policy server 114 to retrieve policies associated with the trust profile of the application process.

Using this approach, identity-based segmentation may be achieved by creating various "trust profiles" (or identities) for each process of a distributed application. The trust profile includes a set of attributes that describes the particular process and the context in which the application process operates. In some cases, the attributes are represented as a key/value pair, such as "image=nginx" or "environment=production." These attributes can be auto-discovered by the system or created by users.

In some cases, the application context may also include one or more of the following attributes: the user that instantiated the application, the server name on which the application is instantiated on, the data center in which the application is located, the image (i.e., binary executable) that the application is running, the libraries that the application uses, vulnerabilities associated with the application, performance metrics of the application, code commit message(s) from when the application was designed or developed, and/or any other user-specified attribute of the application. For example, in one embodiment the agent 113 monitors when processes are activated and communicates with a management system to automatically discover the attributes. Additionally, a user can define an application as either a production or development application by associating an attribute such as "environment=production" or "environment=development" with all the processes of the application. Certain embodiments assumes that the agent 113 is present on every server where an application process could be instantiated.

In one embodiment the agent 113 determines parameters such as: the user activating the application, the binary (i.e., the executable image) that the application is started from, the libraries that the application depends on, the network interfaces that the application is trying to use, the metadata stored when the application was installed by a management tool. In an alternative embodiment, when applications are instantiated as containers, the agent 133 captures metadata associated with the container as attributes (key/value pairs). In alternative embodiments the agent 133 can use any information locally available in the server to create a trust profile associated with this application. FIG. 2 illustrates one example of a trust profile and a set of attributes. The attributes are key/value pairs and they are used by policies to authenticate application processes.

In one embodiment of the invention, a plurality of policy servers 114 are available in the network where agents can communicate with and retrieve policy information. The implementation and synchronization of the policy servers can follow one of multiple techniques. In general, the policy servers share a common store for storing policy information and process requests for policy information by scanning through the policies and finding the policies matching specific trust profile requirements. In some cases, users may be provided with an Application Programming Interface (API) to communicate with the policy servers and program the required policies. Such an API may be a Restfull API or any other method that allows users to interact with a program. The agents then communicate with the policy server through the remote API.

In certain implementations, a policy server 114 stores a set of policies that describe how applications with different trust profiles are permitted to interact with each other such as a set of rules that describe relationships among application processes and attributes. For example, a policy can dictate that processes with high security vulnerabilities cannot interact with production processes, or that workloads in different data centers must encrypt their traffic. An example of a policy is shown below:

"if application with attributes environment=production attempts to communicate with an application with attributes environment=development, then disallow traffic"

In order to enforce a policy, the agent intercepts communication requests from local application processes by using facilities in the underlying kernel. For example, in a Linux based system the agent 133 uses the libnetfilter facility of the kernel, and in a Windows system it uses packet filtering capabilities. Alternative implementations can be based on drivers or pluggable kernel modules or even hardware mechanisms implemented in the network interface card. The request is also cryptographically signed with a secret key only known to the agent.

In general, the communication request together with the trust profile is transmitted from an originating server to a recipient server hosting an application process being requested by the application. At the receiving server, the agent captures the communication request, retrieves the trust profile of the originating application process, cryptographically validates the signature of the trust profile to verify that this is valid profile, and then matches the trust profile against the proper policy. The agent 113 knows both the trust profile of the originating server and the trust profile of the receiving server and it can therefore determine whether the policy matches these trust profiles. If the policy allows communications, the agent removes the associated trust profiles and forwards the communication attempt to the application process on the receiving server. If the policy does not allow the communication the agent simply drops the communication request.

When the receiving application responds acknowledging the communication attempt, the agent in the receiving server intercepts the communication again. In this case it associates with the acknowledgement of the communication the trust profile of the receiver and cryptographically signs with a secret key. The acknowledgement is transmitted to the originating server.

At the originating server, the agent intercepts the acknowledgement, validates the signature of the trust profile and again verifies the trust profile with the local policy. If the policy matches the agent forwards the acknowledgement to the originating application after removing the trust profile. At this point the originating and receiving applications have both identified and validated each other using the common policies and can freely communicate.

Figure 3:
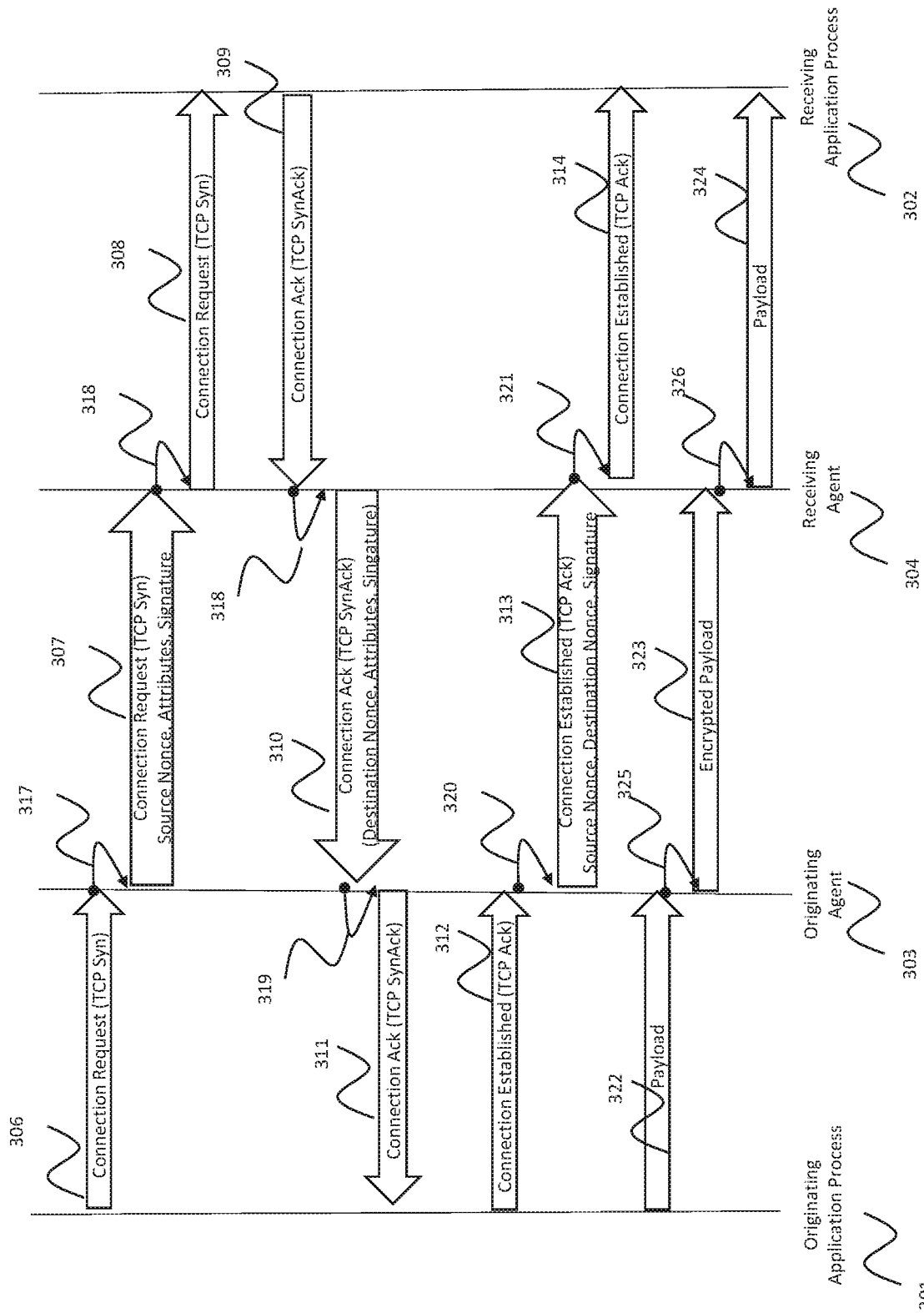
FIG. 3 is a flow diagram illustrating the transmission paths of information sent between application processes in accordance with various embodiments of the invention.

One goal of the system is to restrict communications between applications and only allow application interactions when this is allowed by a defined policy from the policy server 114. One specific protocol used to establish a secure communication using the above-described technique is illustrated in more detail in FIG. 3, in which the originating application process (or initiator of the communication) 301 is attempting to communicate with the receiver application process 302. The agents 304 and 305 operate in the originator and receiver of the communication request respectively.

Figure 4:
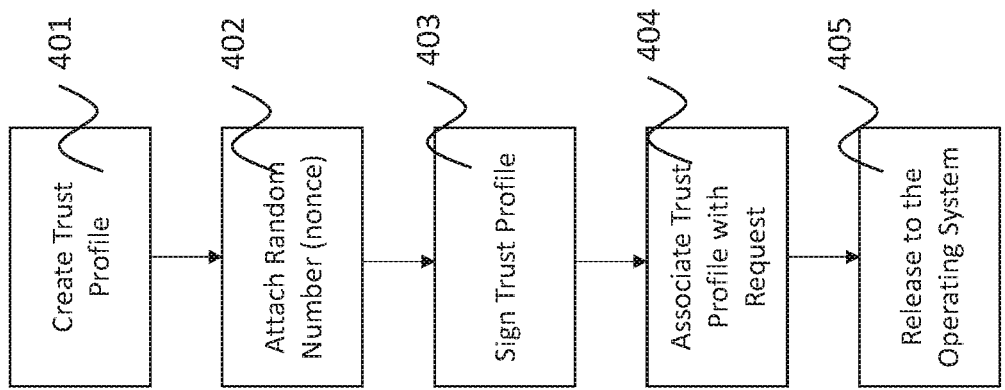
FIG. 4 is a flow chart illustrating a method for creating trust profiles for originating application processes in accordance with various embodiments of the invention.

In the first step 306, an application initiates a communication request. In the case of a TCP system this is done as the Syn packet of the request. The application request is captured by the agent and the agent adds the trust profile signed by a cryptographic key to the request (step 317). The detailed operation of the agent for this step is described in FIG. 4. In step 401 the agent determines the trust profile of the originating application. In step 402, the agent attaches to the trust profile a random number that is only used once for every communication (nonce). In step 403, the agent cryptographically signs the trust profile. The agent can either use a pre-shared key or a public/private key infrastructure or any other digital signing mechanism available to someone skilled in the art. In step 404 the agent attaches the trust profile and signature to the connection request. In one embodiment of the invention, the agent includes the trust profile as payload on TCP SYN packets. In general TCP Syn Packets carry no payload and are just used as mechanism to initiate connections. In this embodiment TCP Syn packets also carry the trust profile of the application initiating the request. In step 405 the agent releases the request to the underlying operating system in order to transmit it over the network to target application. The request is transmitted as in step 307.

Figure 5:
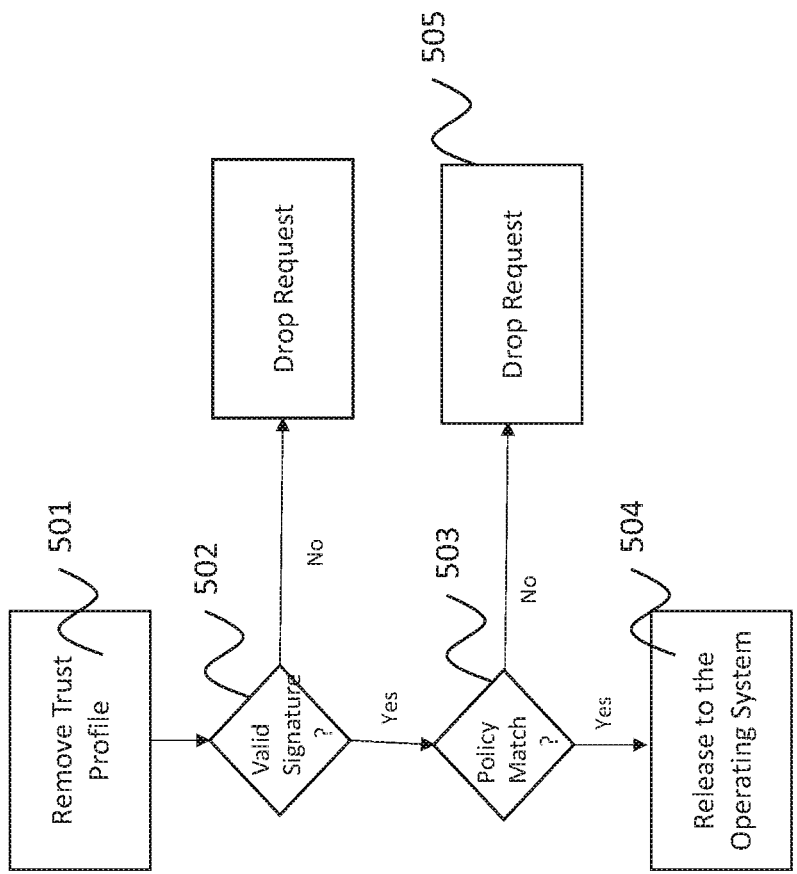
FIG. 5 is a flow chart illustrating a method for processing a transmission received at a server in accordance with various embodiments of the invention.

The agent in the receiving server captures the request (step 318) validates the trust profile by verifying the digital signature that was placed on the payload by the initiating agent. The detailed procedure is depicted in FIG. 5. In step 501, the agent removes the trust profile and associated signature from the received request. In step 502, the agent validates the signature of the trust profile so that it knows that it has been created by a trusted party. In step 503, the agent validates with a local memory store that a policy exists that allows the local application to receive traffic from an application that has attributes in its trust profiles such as the one received. In step 504, if the policy is validated, the agent removes the trust profile and transmits the request to the receiver application (step 308 of protocol). In step 505 if the policy does not allow communication, the agent drops the request and never allows it to be forwarded to the application. In the embodiment that uses TCP Syn packets to communicate the trust profile, this means that the agent will remove the payload from the Syn packets. So the receiving application does not know that the agent introduced a trust profile in the communication. In such an operation, the agent might need to adjust some fields of the TCP header such as sequence numbers so that the corresponding TCP stack performs as designed.

Figure 6:
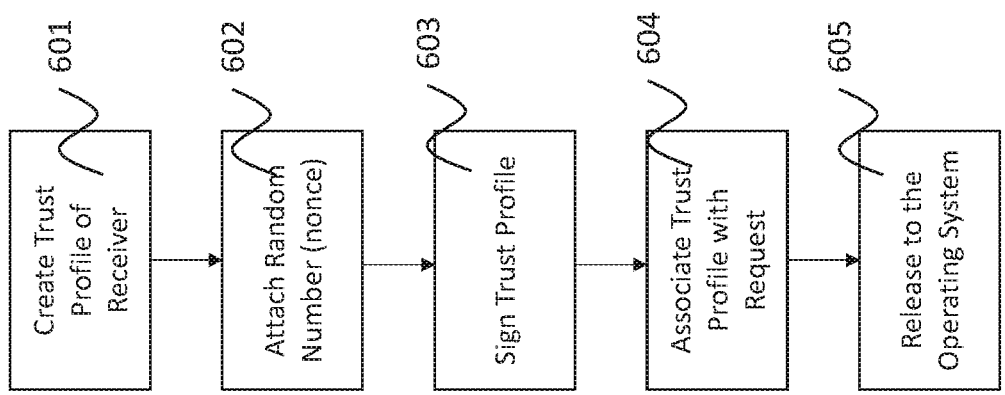
FIG. 6 is a flow chart illustrating a method for creating trust profiles for receiving application processes in accordance with various embodiments of the invention.

In some embodiments, the receiving application process acknowledges communication to the originating application process. For example, in the case of TCP this is achieved by sending back an Syn/Acknowledgement packet (SynAck) (step 309). When the application transmits this packet, the receiving agent intercepts the packet and it associates the trust profile of the receiving application with this packet (step 318), which is shown in greater detail in FIG. 6.

In step 601, the agent determines the trust profile of the receiving application process. In step 602, the agent associates a random number that is only used once with the trust profile (nonce). In step 603, the agent cryptographically signs the trust profile so that other agents can verify its validity. In step 604, the agent associates this trust profile with the connection acknowledgement (SynAck packet). In step 605, the packet is released back to the operating system so that it can be transmitted to the originating application. The communication acknowledgement together with the trust profile and signature are send back to the originating server in step 310.

Figure 7:
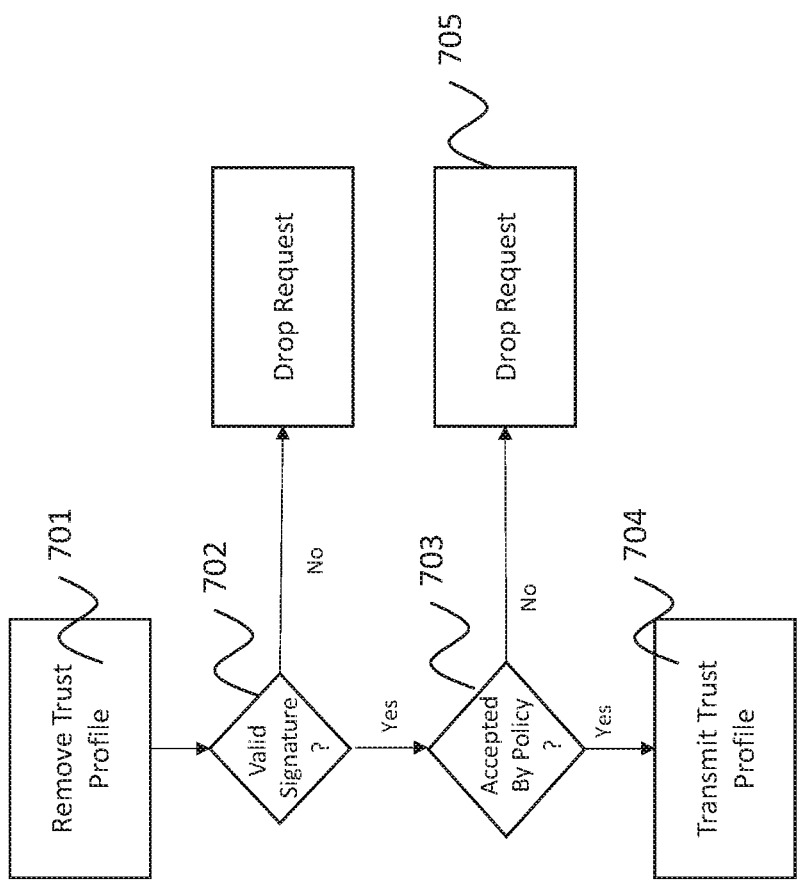
FIG. 7 is a flow chart illustrating a method for processing an acknowledgement transmission received at an originating server in accordance with various embodiments of the invention.

When the connection acknowledgement is received at the originating server, the agent intercepts the transmission, reads the trust profile, validates the signature, and verifies that the originating application was actually trying to communicate with an application of the specific trust profile and this is also allowed by the policy (step 319). The detailed operations are depicted in FIG. 7.

In step 701 the agent reads the trust profile and signature from the connection acknowledgement. In step 702, the agent validates the signature of the trust profile using any of the common cryptographic techniques. In step 703, the agent validates that the policy allows the originating application process to communicate with an application process that has a trust profile as the one received in the acknowledgement. In step 704 the acknowledgement is released to the originating application process at step 311. If the policy does not allow the communication, the acknowledgement is dropped in step 705.

In some embodiments that connection setup process includes a third step where the originating application process acknowledges that it received an connection acknowledgement from the target application process—referred as a "connection established step" (step 312). This is common in TCP communications and it is done through a final Acknowledgement packet. In this case, when the third step of the protocol is performed, the originating agent will associate with the final acknowledge the two nonces that were seen during the previous two steps. FIG. 8 depicts this procedure. The originating agent will determine the two nonces in step 801. It will then sign the two nonces using a cryptographic key in step 802. It will attach the nonces and signature to the packet in step 803 and it will release it to the operating system for transmission on step 804. This is done in order to avoid a Man-in-the-middle attacks where an third party hostile entity attempts to break the protocol. This final acknowledgement is transmitted on step 313. The receiving agent must intercept and validate this acknowledgement, including validating that the signed nonces are the correct ones.

The receiving agent will receive the connection established acknowledgment in Step 321. The operation of the receiving agent for this step is depicted in FIG. 9.

In step 901 the receiving agent will remove the nonces and signature. In step 903 it will validate the signature. If the signature is not valid, it will be dropped. If the signature is valid the nonces will be validated that match the nonces seen in the previous communications, and if they are valid the packet will be accepted (step 904), otherwise it is dropped. If the packet is accepted it is released to the operating system and sent to the receiving application (step 314).

At this point the connection is established at both servers and the two application processes can exchange data. Based on the policy decision, the agent automatically intercepts all subsequent packets and encrypts the payload if confidentiality is warranted, although encryption of the subsequent payloads may not desired in all cases, so encryption is an optional component in steps 322 through 323. In step 322, the agent receives an unencrypted payload and encrypts the payload (step 325). In Step 323 it transmits an encrypted payload over the network, and in step 326 the receiving agent unencrypts the payload and delivers an unencrypted payload to the application (step 324). Subsequent payload transmission can follow a similar process.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for establishing authenticated communications among application processes, the method comprising:
   providing authentication agents to a plurality of servers, each of the plurality of servers hosting one or more application processes and operating in different domains, wherein each authentication agent accesses policies related to each of the one or more application processes;
   intercepting a transmission from an originating application process executing on an originating server by a first authentication agent on the originating server prior to transmission to a receiving application process executing on a receiving server;
   appending a trust profile associated with the originating application process to the transmission;
   releasing the transmission to the receiving server;
   intercepting and validating the transmission at the receiving server by a second authentication agent on the receiving server,
      wherein the validation comprises validating a digital signature placed in a payload of the transmission by the first authentication agent and comparing the trust profile received with the transmission to one of the policies, and
      wherein the one of the policies comprises permitted interactions between the originating application process and the receiving application process;
   removing the trust profile from the transmission and, when the validation is successful:
      forwarding the transmission to the receiving application process for processing thereby; and
      providing an acknowledgement transmission from the receiving server to the originating server confirming the transmission was received and processed by the receiving application process; and
   when the validation is not successful, dropping the transmission such that it does not reach the receiving application process and no acknowledgement transmission is sent to the originating application process.

2. The method of claim 1 wherein the trust profile comprises a process identifier and a context.

3. The method of claim 2 wherein the context comprises one of a production environment, a testing environment and a development environment.

4. The method of claim 1 wherein the originating and receiving application processes support a common application.

5. The method of claim 1 wherein the policies are provided by a common policy server accessing a single policy store.

6. The method of claim 1 wherein providing the acknowledgment transmission comprises:
intercepting the acknowledgement transmission by the second authentication agent on the receiving server prior to transmission;
associating a trust profile associated with the receiving application process to the acknowledgement transmission; and
transmitting the acknowledgement transmission from the receiving server to the originating server; and
further comprising, at the originating server:
intercepting the acknowledgement transmission prior to reaching the originating application process;
validating the trust profile associated with the receiving application process; and
forwarding the acknowledgment transmission to the originating application process.

7. The method of claim 6 wherein validating the trust profile associated with the receiving application process comprises comparing the trust profile received with the acknowledgement transmission to one of the policies, and wherein the one of the policies comprises permitted interactions between the originating application process and the receiving application process.

8. The method of claim 7 further comprising permitting subsequent transmissions between the originating application process and receiving application process without interception by the first authentication agent or the second authentication agent.

9. A system for managing communication among application processes, the system comprising:
at least one memory for storing computer-executable instructions; and
at least one processing unit for executing the instructions stored on the at least one memory, wherein execution of the instructions programs the at least one processing unit to perform operations comprising:
providing authentication agents to a plurality of servers, each of the plurality of servers hosting one or more application processes and operating in different domains, wherein each authentication agent accesses policies related to each of the one or more application processes;
intercepting a transmission from an originating application process executing on an originating server by a first authentication agent on the originating server prior to transmission to a receiving application process processes executing on a receiving server;
appending a trust profile associated with the originating application process to the transmission;
releasing the transmission to the receiving server;
intercepting and validating the transmission at the receiving server by a second authentication agent on the receiving server,
wherein the validation comprises validating a digital signature placed in a payload of the transmission by the first authentication agent and comparing the trust profile received with the transmission to one of the policies, and
wherein the one of the policies comprises permitted interactions between the originating application process and the receiving application process;
removing the trust profile from the transmission and, when the validation is successful succeeded:
forwarding the transmission to the receiving application process for processing thereby; and
providing an acknowledgement transmission from the receiving server to the originating server confirming the transmission was received and processed by the receiving application process; and
when the validation is not successful, dropping the transmission such that it does not reach the receiving application process and no acknowledgement transmission is sent to the originating application process.

10. The system of claim 9 wherein the trust profile comprises a process identifier and a context.

11. The system of claim 10 wherein the context comprises one of a production environment, a testing environment and a development environment.

12. The system of claim 9 wherein the originating and receiving application processes support a common application.

13. The system of claim 9 further comprising a common policy server for providing the policies from a single policy store.

14. The system of claim 9 wherein providing the acknowledgment transmission comprises:
intercepting the acknowledgement transmission by the second authentication agent on the receiving server prior to transmission;
associating a trust profile associated with the receiving application process to the acknowledgement transmission; and
transmitting the acknowledgement transmission from the receiving server to the originating server; and
further comprising, at the originating server:
intercepting the acknowledgement transmission prior to reaching the originating application process;
validating the trust profile associated with the receiving application process; and
forwarding the acknowledgment transmission to the originating application process.

15. The system of claim 14 wherein validating the trust profile associated with the receiving application process comprises comparing the trust profile received with the acknowledgement transmission to one of the policies, and wherein the one of the policies comprises permitted interactions between the originating application process and the receiving application process.

16. The system of claim 15 wherein subsequent transmissions between the originating application process and receiving application process are permitted without interception by the first authentication agent or the second authentication agent.

* * * * *